United States Patent

Hori

Patent Number: 6,082,935
Date of Patent: Jul. 4, 2000

[54] SOLID CEMENTED CARBIDE BALL NOSE END MILL

[75] Inventor: Isao Hori, Toyama, Japan

[73] Assignee: Nachi Fujikoshi Corp., Toyama, Japan

[21] Appl. No.: 09/097,147

[22] Filed: Jun. 12, 1998

[30] Foreign Application Priority Data

Jun. 13, 1997 [JP] Japan ................................ 9-171171

[51] Int. Cl.$^7$ .................................................. B23B 5/10
[52] U.S. Cl. ............................ 407/54; 407/63; 407/118; 407/65; 408/144
[58] Field of Search ................................ 407/35, 40, 42, 407/54, 65, 113, 114, 118, 119, 63; 408/144, 145

[56] References Cited

U.S. PATENT DOCUMENTS

| | | | |
|---|---|---|---|
| 1,977,845 | 10/1934 | Emmons | 408/144 X |
| 4,132,493 | 1/1979 | Hosoi | 407/53 |
| 5,379,854 | 1/1995 | Dennis | 408/145 X |
| 5,558,475 | 9/1996 | Hakansson et al. | |
| 5,685,671 | 11/1997 | Packer et al. | 407/54 |
| 5,725,338 | 3/1998 | Cabaret et al. | 407/54 |
| 5,879,823 | 3/1999 | Prizzi et al. | 407/119 |

*Primary Examiner*—Henry W. H. Tsai
*Attorney, Agent, or Firm*—Venable; Gabor J. Kelemen

[57] ABSTRACT

An improved solid cemented carbide ball nose end mill is provided which enables a cutting of a quenched or hardened difficult-to-machine material without any chipping or break of edge under the condition of a high speed and high load cutting. The improved end mill comprises a substantially semi-spherical ball nose portion provided with such cutting edges as to form a virtually S-shaped symmetrical configuration as viewed from the tip end and a tool body integral with said ball nose portion and having a peripheral cylindrical portion being provided with no peripheral cutting edge and a shank at the rear end thereof. The cutting edges extending from the tip end of the ball nose portion to the respective terminals positioned at the furthest at the vicinity of the border between the ball nose portion and the tool body are formed in the ball nose portion only. Preferably, each of a rake angle and a relief angle of the cutting edge is set between 0° and –10°, and between 6° and 16°, respectively, further the cutting edges are coated with a titanium-aluminum nitride based material film.

4 Claims, 2 Drawing Sheets

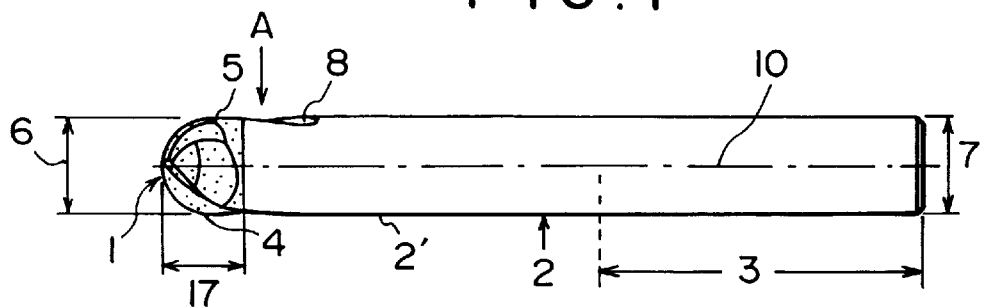
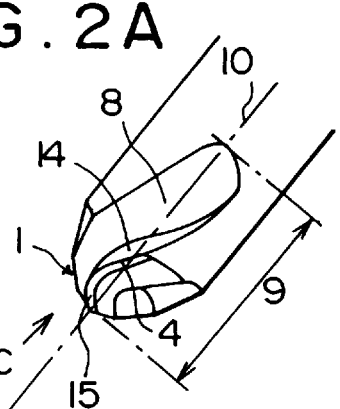
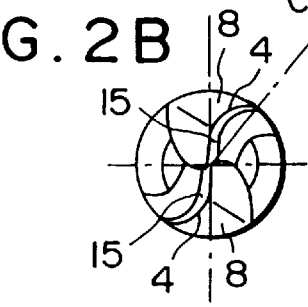
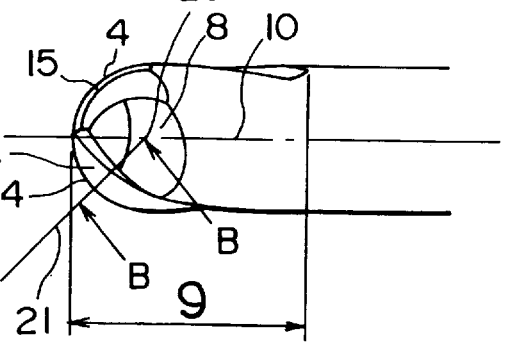
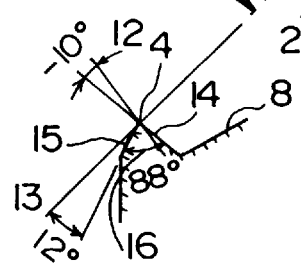

CUTTING CONDITIONS
DIMENSIONS OF END MILL: R5 TWO FLUTE
WORK MATERIAL: SKD11 (60HRC)
NUMBER OF REVOLUTIONS: 12000min$^{-1}$
FEED RATE: 2400mm/min
CUT DEPTH: $a_a$ = 0.15mm  $P_1$ = 0.3mm
CUTTING OIL: EMULSION
CUTTING METHOD: DOWN CUT, 30° CONTOUR CUTTING
TEST MACHINE: A VERTICAL MACHINING CENTER

30° CONTOUR CUTTING

SOLID CEMENTED CARBIDE BALL NOSE END MILL

BACKGROUND OF THE INVENTION (1) Field of the Invention

The present invention relates to an improvement of a solid cemented carbide ball nose end mill.

(2) Description of the Related Art

A conventional solid cemented carbide ball nose end mill comprises a substantially semi-spherical ball nose portion having cutting edges on the top end thereof and a tool body having a peripheral cylindrical portion with peripheral cutting edges extending from each of the cutting edges and a cylindrical or conical shank at the rear end thereof, as disclosed in U.S. Pat. No. 5, 558,475. Around the top end, two or four cutting edges each having a positive rake angle are symmetrically positioned as viewed from the top end, and the cutting edges extend over the peripheral cylindrical portion to form peripheral cutting edges having 0.5 to 3 times the length of the outer diameter of the end mill. In most cases, each surface of the cutting edges is coated with a hard material including a TiCN film. Such a solid cemented carbide ball nose end mill is frequently used for a three-dimensional machining of a metal mold which requires a higher speed and higher load cutting.

However, a metal mold and the like is generally made of a difficult-to-machine material like a quenched or hardened material. Accordingly, in case of a high efficient finish machining under a higher speed and higher load cutting, some troubles such as a chipping of the cutting edges and a poor cutting accuracy occurred.

SUMMARY OF THE INVENTION

An object of the present invention is to provide a solid cemented carbide ball nose end mill which has the abilities of realizing a more efficient cutting performance and further performs a higher speed and higher load cutting of a quenched or hardened material known as a difficult-to-machine material.

As the results of the applicant's study, he recognized that the extremities of the peripheral cutting edges extending over the peripheral cylindrical portion of the conventional ball nose end mill are so long as to lack the rigidity, and further, each of the cutting edges is prone to a chipping because of its positive rake angle; these, solely or combined together, cause an insufficiency of cutting accuracy and a chipping of the cutting edges. Additionally, considering the fact that the peripheral cutting edges of the conventional ball nose end mill are very seldom utilized in a three-dimensional machining of a metal mold and the like, the applicant recognized that the rigidity of a cutting edge is highly improved if the length of each extremities of the peripheral cutting edge is shortened in a manner as to remove them entirely.

Based on applicant's study, the above problems of the conventional ball nose end mill has been solved by providing a solid cemented carbide ball nose end mill according to the present invention which comprises a substantially semi-spherical ball nose portion provided with a plurality of cutting edges forming a virtually S-shaped symmetrical configuration as viewed from the tip end, and a tool body integral with the ball nose portion and having a peripheral cylindrical portion being provided with no peripheral cutting edge and a shank at the rear end thereof, and further, the solid cemented carbide ball nose end mill has the cutting edges extending from the tip end of the ball nose portion to the respective terminals positioned at the furthest at the vicinity of the border between the ball nose portion and the tool body are formed in the ball nose portion only. A length of the cutting edges is determined to be sufficient length required for machining of a metal mold surface.

By such an arrangement, since the cutting edges are disposed in the ball nose portion only which extends from the tip end thereof to the vicinity of the border between the ball nose portion and the tool body at the furthest, the present invention can provide a solid cemented carbide ball nose end mill in which the rigidity of the cutting edges is largely improved by shortening each length of the cutting edges, and further, a chipping caused by the lack of the rigidity and a reduction of the cutting accuracy are prevented, thereby a higher speed and higher load cutting can be realized even when a quenched or hardened material, known as a difficult-to-machine material, is machined.

Additionally, if each cutting edge is provided with a positive rake angle, it is prone to a chipping to thereby decrease the tool life, and if each cutting edge has a negative rake angle less than −10°, it dulls a cutting sharpness and reduces a cutting action, therefore a rake angle is preferably determined to be between 0° and −10°. Meanwhile, if a relief angle of each cutting edge is less than 6°, the tool life is shortened, and if the relief angle is increased, its cutting sharpness is enhanced, however, when the relief angle becomes over 16°, the cutting edge brings on a chipping readily. Therefore, preferably, a relief angle of between 6° and 16° prevents a chipping and realizes a highly efficient cutting. Each of the rake angle and the relief angle is measured in the section of the cutting edge (FIG. 3B) along the line (B—B line in FIG. 3A, donation 21) which passes through the center of the ball nose portion at an angle of 45° to a body axis.

More preferably, for the same reason, a tool angle as measured likewise is set to be between 80° and 90° (reference numeral 16 in FIG. 3B). If an angle between the top end of the ball nose portion and the border between the ball nose portion and the tool body is set at an angle of 90° which is measured between two lines each passing through the center of the ball nose portion, preferably a terminal or extremity position of the cutting edge falls into the range of from 80° and 90°.

Further, each cutting edge is preferably coated with a film of titanium-aluminum nitride based hard material film, thereby the heat-resistance and weld-resistance are raised, enables a more efficient cutting operation. Furthermore, an area for the cutting edges and for a surface coating is limited to only the end ball nose portion. Therefore the ball nose end mill of the present invention of the cutting edges is easier. On the other hand, since cutting of a harder material is accompanied by a high temperature, a titanium carbon nitride (TiCN) based hard material film is inferior in heat-resistance and weld-resistance, it is preferably replaced by a surface treatment which employs a titanium-aluminum nitride (TiAlN) based hard material film.

BRIEF DESCRIPTION OF THE DRAWINGS

FIG. 1 is a side view showing a two-flute solid cemented carbide ball nose end mill according to a preferred embodiment of the present invention.

FIG. 2A is an enlarged top plan view illustrating a top end portion as viewed in the direction of the arrow A in FIG. 1.

FIG. 2B is an enlarged front view illustrating the top end portion as viewed in the direction of the arrow C in FIG. 2A.

FIG. 3A is an enlarged side view showing the top end portion of FIG. 1.

FIG. 3B is a fragmentary enlarged sectional view illustrating a section of the cutting edge taken along the line 21 (B—B line in FIG. 3A) which passes through the center of the ball portion and is positioned at an angle of 45° to a body axis 10.

DETAILED DESCRIPTION OF THE PREFERRED EMBODIMENTS

Figure 4A:
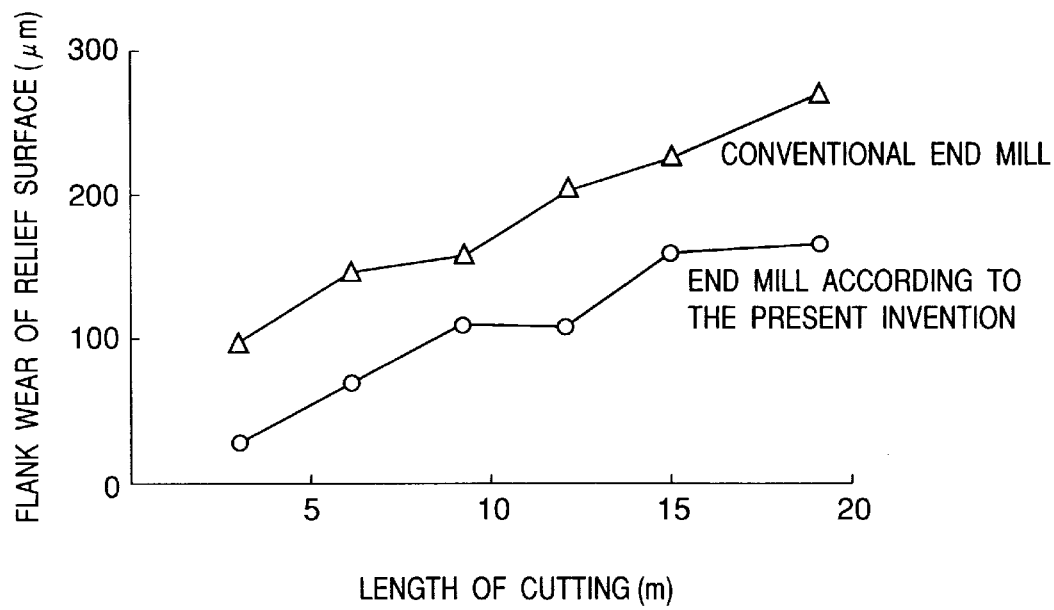
FIG. 4A is a graph showing the comparison results between a ball nose end mill of the present invention and a conventional ball nose end mill.

Referring to the accompanying drawings, a detailed description of a preferred embodiment of the present invention will be given hereunder. As illustrated in a side view in FIG. 1 showing a preferred embodiment of a two-flute solid cemented carbide ball nose end mill, the end mill of the present invention comprises a substantially semi-spherical ball nose portion 1 and a cylindrical tool body 2 integral with the ball nose portion and having a peripheral cylindrical portion 2' being provided with no peripheral cutting edge and a shank 3 at the rear portion thereof. As seen from FIG. 2B, two cutting edges 4,4 formed on the substantially semi-spherical ball nose portion 1 extend from the tip of the body axis 10 to the border 5 between the ball nose portion 1 and the tool body 2 over the angle range of 90° and are not formed on any other area at all, consequently there are not provided any peripheral cutting edges extending further from the border 5.

In other words, in FIG. 1, since the outer diameter 6 of the ball nose portion 1 and the outer diameter 7 of the cylindrical portion 2' of the tool body 2 are equal, the cutting edges are formed on the semi-spherical portion only. Consequently, a length 9 (FIG. 2A) of the cutting edge flutes 8,8 required to form the cutting edges 4,4 can be shortened substantially to thereby contribute to raise the rigidity of the end mill.

As shown in FIG. 2B, the cutting edges 4,4 are formed to be symmetrical S-shaped as viewed from the top end thereof. Each of the cutting edges 4,4 has a continuously varying helix angle being contact with the S-shaped cutting edge. The reference numerals 14 and 15 designate a rake surface and a relief surface respectively, as illustrated in a fragmentary enlarged view of FIG. 3B showing a section taken along the B—B line 21 of the cutting edge 4 of FIG. 3A and in a side view of FIG. 3A. As depicted in FIG. 3B, a rake angle 12 and a relief angle 13 each is measured in the section view along the line (B—B line in FIG. 3A, reference 21) which passes through the center 20 of the ball nose portion at an angle of 45 ° to a body axis 10. In this embodiment, the rake angle 12, the relief angle 13 and the tool angle 16 are set to be 31 10°, 12° and 88°, respectively. Preferably, the rake angle 12, the relief angle 13 and the tool angle 16 are determined to be between 0° and −10°, between 6° and 16°, and between 80° and 90° respectively. Partly over the range 17 (FIG. 1) which extends from the ball nose portion 1 to the tool body 2 beyond the border 5 is coated with a titanium--aluminum nitride based hard material film, that is, at least a whole of the cutting edges 4,4 is coated therewith.

EXAMPLE

A fast finish machining using a two-flute solid cemented carbide ball nose end mill according to the present invention and a conventional ball nose end mill is performed for a comparison test. For this test, for the cutting edges of a ball nose end mill of the present invention, the rake angle 12, the relief angle 13 and the tool angle 16 are set to be −10°, 12° and 88°, respectively, as shown in FIG. 3B. The outer diameter of the cutting edge is 10 mm, and the cutting edges are coated with a titanium-aluminum nitride based hard material film. The conventional ball nose end mill for comparison is a two-flute solid cemented carbide ball nose end mill in which the cutting edges are extended up to the peripheral cylindrical portion to form peripheral edges, and all of the ball nose portion, the cutting edges and the peripheral cutting edges are coated with a titanium carbon nitride (TiCN) based hard material film. The rake angle, the relief angle and the tool angle are set to be 6°, 14° and 70° respectively, and the outer diameter of the cutting edge is 10 mm.

According to the employed method for the test, the ball nose end mills of the present invention and the conventional type are mounted to a vertical machining center, and the quenched harder material SKD11 (60HRC) is subjected to the cutting using an emulsion cutting oil under these conditions: number of revolutions 12,000 RPM; feed rate 2,400 mm/min; cut depth in the axial direction $a_a$=0.15 mm; pick feed $P_f$32 0.3 mm; and contour cutting with a down cut of 30° (to cut a work surface with an inclination angle of 30° to the end mill axis in the traverse direction of the surface). This contour cutting is illustrated in FIG. 4B.

Figure 4B:
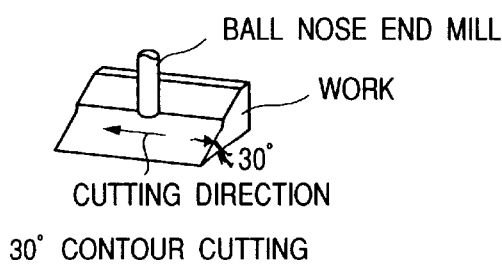
FIG. 4B is a perspective view illustrating the contour cutting shown in FIG. 4A.

The results are shown in FIG. 4A. The flank wear of the relief surface 15 of the cutting edges 4 of the ball nose portion 1 is measured as a function of the cutting length (m). As seen from FIG. 4A, with reference to the cutting length 20 m, the flank wear of the relief surface of the conventional ball nose end mill is 280 m, and in the case of the present invention it indicates 170 m which is a reduction by around 40%. Further, chipping occurred in the conventional ball nose end mill, while none occurred in the ball nose end mill of the present invention, therefore the latter is expected to have a long tool life.

The above embodiment refers to a two-flute solid cemented carbide ball nose end mill; however, it will be apparent that the present invention is also applicable to a four-flute solid cemented carbide ball nose end mill.

What is claimed:

1. A solid cemented carbide ball nose end mill comprising
   (a) a half-spherical ball nose portion having a tip end;
   (b) a tool body integral with said ball nose portion and having
      (1) a peripheral cylindrical portion adjoining said half-spherical ball nose portion and being free from any peripheral cutting edge and
      (2) a shank adjoining a rear end of the cylindrical portion; and
   (c) a plurality of cutting edges carved directly into the ball nose portion and exhibiting a virtually S-shaped symmetrical configuration as viewed from said tip end; said cutting edges extending from said tip end to cutting edge terminals positioned at the furthest adjacent a border between said half-spherical ball nose portion and said tool body, whereby said cutting edges are formed solely in said half-spherical ball nose portion.

2. The solid cemented carbide ball nose end mill according to claim 1, wherein each of a rake angle and a relief angle of said cutting edges falls into a range of between 0° and −10°, and a range of between 6° and 16°, respectively, each of which is measured in the conic section along a line passing through the center at the juncture between said half-spherical ball nose portion and said peripheral cylindrical portion, and inclined at an angle of 45° to the central longitudinal axis of the tool body.

3. The solid cemented carbide ball nose end mill according to claim 1, wherein said cutting edges are coated with a titanium-aluminum nitride based material film.

4. The solid cemented carbide ball nose end mill according to claim 2, wherein said cutting edges are coated with a titanium-aluminum nitride based material film.

\* \* \* \* \*